United States Patent [19]

Peeples

[11] 4,283,516
[45] Aug. 11, 1981

[54] PROCESS FOR THE SUSPENSION POLYMERIZATION OF POLYVINYL CHLORIDE

[75] Inventor: William D. Peeples, New Castle, Del.

[73] Assignee: Diamond Shamrock Plastics Corporation, Dallas, Tex.

[21] Appl. No.: 89,096

[22] Filed: Oct. 29, 1979

Related U.S. Application Data

[63] Continuation-in-part of Ser. No. 19,343, Mar. 12, 1979, abandoned.

[51] Int. Cl.$^3$ .................................................. C08F 2/18
[52] U.S. Cl. ................................ 526/202; 526/344.2; 526/910
[58] Field of Search ...................... 526/202, 344.2, 910

[56] References Cited

U.S. PATENT DOCUMENTS

| | | | |
|---|---|---|---|
| 3,929,753 | 12/1975 | Itoh | 526/344.2 |
| 4,000,355 | 12/1976 | May | 526/344.2 |
| 4,143,224 | 3/1979 | Klippert et al. | 526/344.2 |
| 4,208,499 | 6/1980 | Maruhashi et al. | 526/202 |

*Primary Examiner*—John Kight, III
*Attorney, Agent, or Firm*—Arthur S. Collins

[57] ABSTRACT

The present invention relates to the manufacture of suspension grade PVC and other vinyl chloride resins of superior overall quality, especially in that they possess both high bulk densities and excellent porosities as shown by their fast absorption rates for hot liquid plasticizers. The key feature of the suspension polymerization process involved is the use of a particular combination of two types of suspending agents throughout the process, namely a polyvinyl alcohol resin with a hydrolysis level of about 68 to about 78 percent together with a hydroxypropyl cellulose ether with a molar substitution of between about 2 and about 4.

9 Claims, No Drawings

PROCESS FOR THE SUSPENSION POLYMERIZATION OF POLYVINYL CHLORIDE

This application is a continuation-in-part of my original U.S. application, Ser. No. 019,343, which was filed on Mar. 12, 1979, now abandoned.

BACKGROUND OF THE INVENTION

The present invention relates to the manufacture of synthetic polymers and, more particularly, to an improved process for the suspension polymerization of polyvinyl chloride (PVC) and the improved PVC resin produced thereby.

In the suspension polymerization of PVC, vinyl chloride monomer (VCM), water, initiator, buffer, suspending agent and other additives are charged to a polymerization reactor under pressure, and the reaction is allowed to continue over a period of hours until the desired degree of polymerization is achieved. In commercial practice, it is not unusual to use more than one initiator, and/or buffer, and/or suspending agent, and, of course, comonomers and other additives are frequently added to the reactor before initiation of the polymerization reaction, or after partial or even complete polymerization of the vinyl chloride.

The initiator, the suspending agent, the buffers, and other processing aids added to the reactor, as well as the temperature at which the reaction is carried out, can all affect not only the reaction itself but also the product. Thus, the choice of suspending agent can affect not only the facility with which the polymerization reaction proceeds but also many characteristics of the PVC resin produced. The molecular weight, particle size distribution, porosity, bulk density and a wide variety of other properties may thus be affected by the choice of processing conditions and processing additives employed with reaction. The degree to which a given physical property may be truly "controlled" (as opposed to merely affected or altered) by variations in process conditions and/or process additives varies widely, though many are well-known and almost universal in the art, e.g., adjusting reactor temperatures to control molecular weight.

In the past, it was well-known to employ a wide variety of suspending agent, including cellulose ether products such as methyl cellulose and hydroxypropyl methylcellulose, gelatin, inorganic salts, clays and the like and certain highly hydrolyzed polyvinyl alcohols (PVA) to mention but a few. Various combinations of these and other materials have all been employed from time to time in commercial manufacture of PVC suspension resins.

Any attempt to produce end products from pure PVC resin, by itself, would result in an extremely rigid, inflexible, probably useless product, which would have already suffered heat degradation in its formation, and which would be subject to further light degradation if it is kept for any period of time. In order to produce useful products from PVC, it is necessary for the PVC resin manufacturer, end user, or an intermediate "compounder" to admix light and heat stabilizers, in most cases at least some plasticizer, and other optional additives with the PVC resin, to produce a "PVC compound."

For this reason, some of the most important physical properties of PVC resins are not those most readily apparent in the PVC resin, per se, but the properties which affect the further processing of that resin to produce PVC compounds and/or the physical properties of such PVC compound. PVC compounds produced by the resin manufacturer or an intermediate compounder are usually sold either in the form of extruded pellets, or as free-flowing powders, and this form also dictates whether particular properties may be essential, or merely desirable, in the PVC resin to be employed.

In manufacturing free-flowing powder PVC compounds, it is essential to produce a PVC resin which will quickly absorb the liquid additives with which it will be admixed to produce the compound. This is particularly true as to the plasticizer, which usually forms the bulk of the liquid additives and which is normally an oily liquid, such as, for example, dioctylphthalate. The time required for the PVC resin to absorb all of the liquid additives is a function of the porosity of the resin particles and is clearly an extremely important property of a PVC resin intended for such an end use. There are many techniques for determining porosity, some of which are absolute measures, while others are relative. For example, an absolute measure of the interpore volume (IPV) can be obtained by mercury penetration techniques using a porosemeter, as described by ORR, "Applications of Mercury Penetration to Materials Analysis," *Powder Technology*, 3 (1969/70) 117–123. While there are also many arbitrary procedures to provide a relative measure of this property, the most commonly employed procedure is probably the test for the so-called Brabender Dry-up Time (BDUT).

The BDUT test measures the plasticizer absorption rate of a resin. The absorption rate is relative since it depends on the molecular size of the plasticizer, the mixing temperature, and resin characteristics such as pore volume, pore diameter, and particle size. Plasticizer absorption rate is important in the manufacture of flexible compounds and is critical in dry-blend operations such as fluid bed coating. Therefore, while BDUT is only a relative measure of IPV, it is a direct measure of the ultimate desired property, the facility with which the resin will absorb the liquid additives.

In the BDUT test, the mixing bowl is maintained at a constant temperature. A filled resin mix is added to the mixing bowl and allowed to come to equilibrium before adding the plasticizer-stabilizer mix. Upon addition of the plasticizer, the recorded torque increases sharply. The torque stays at a high level until the excess liquid is absorbed. At this point, the torque begins to decrease and continues to decrease until all of the liquid has been absorbed. The dry-up point is taken as the point on the curve where the torque begins to "line-out"—indicate substantially constant torque.

The test is conducted in a Brabender Plastograph fitting with a 650 ml Sigma Blade Mixing Head. A liquid master batch is prepared by premixing 1905 grams of diisodecyl phthalate, 272 grams of epoxy plasticizer, 136 grams of a liquid barium cadmium stabilizer, and 22.7 grams of a chelator-type stabilizer such as, for example, Mark PL. The ingredients are mixed and maintained at room temperature. The reservoir is preheated to a constant temperature of 89° C.±0.5° C., and the Plastograph dial recorder is zeroed with the apparatus running at 63 rpm. Two hundred grams of dry resin (less than 0.3 percent volatiles) and 85 grams of calcium carbonate are blended, charged to the mixing bowl, and stirred until the blend reaches a temperature of 84° C. (about 5 to 10 minutes) at which point 102±1 gram of the liquid master batch are added to the mixer, and agitation is continued until all of the liquid is absorbed. If all of the liquid is not absorbed within 10 minutes, the sample is designated "no dry-up." It should be noted that in any drying of the resin which may be required to meet the 0.3 percent volatiles limit, overdrying should be avoided since this could alter the porosity of the resin. It should also be noted that the standard formulation described above is arbitrarily employed in order to assure validity of the comparative results.

Polyvinyl alcohol suspending agents are usually prepared by hydrolysis (or saponification) of polyvinyl acetate resulting in the replacement of many of the acetate groups by hydroxyl groups, each such replacement having the net result of converting a vinyl acetate monomer unit to a vinyl alcohol unit. The resulting products are normally characterized in terms of (1) level of hydrolysis (or saponification) and (2) standard solution viscosities representative of average molecular weight. The level or degree of hydrolysis is in reality the average mole percent of vinyl alcohol monomer units in the polymer, a figure normally obtained from the "percent residual acetate," which is actually the percent, by weight, of residual vinyl acetate monomer units as determined by an analytical acid-base titration of the excess sodium hydroxide remaining after complete saponification of the partly hydrolyzed polymer in question.

A broad spectrum of such polymers is commercially available as can be seen from the following table of exemplary materials listed by manufacturers' trade names.

TABLE 1
PVA SUSPENDING AGENTS

| "Trade Names" | % Hydrolysis (molar) | % Residual Vinyl Acetate (by weight) | Viscosity of 4%, by wt., Solution in $H_2O$ (centipoises) |
| --- | --- | --- | --- |
| Alcotex 25/002 | 26.3 | 84.6 | * |
| Alcotex 35/002 | 33.8 | 79.3 | * |
| Alcotex 45/002 | 43.4 | 73.5 | * |
| Polyvic S202 | 45.0 | 70.5 | * |
| Gohsenol LL-02 | 45.0–51.0 | 65.3–70.5 | * |
| Rhodoviol APH | 45.0–52.0 | 64.3–70.5 | * |
| Alcotex 50/002 | 49.6 | 66.5 | * |
| Gohsenol KPZ-04 | 69.0–73.0 | 42.0–46.8 | 2–4 |
| MOWIOL LP5-72 | 71.0–73.4 | 41.5–44.4 | 4–6 |
| Gohsenol KP-08 | 71.0–75.0 | 39.4–44.4 | 6–9 |
| Gohsenol KP-06 | 71.0–75.0 | 39.4–44.4 | 5–7 |
| Alcotex 72.5 | 71.5–73.5 | 41.4–43.8 | 5.5–7.5 |
| Rhodoviol 5/270 | 71.5–73.5 | 38.3–42.6 | 8–10 |
| Gelvatol 40-20 | 72.9–77.0 | 36.9–42.1 | 2.4–3.0 |
| Gelvatol 40-10 | 72.9–77.0 | 36.9–42.1 | 1.8–2.4 |
| Alcotex 73/76L | 73.0–76.0 | 38.2–42.0 | 5.5–7.5 |
| Alcotex 74L | 73.5–74.5 | 40.1–41.4 | 5.5–7.5 |
| Gohsenol KH-17N | 75.5–77.0 | 36.9–38.8 | 39–47 |
| Alcotex 78L | 76.0–79.0 | 34.2–38.2 | 5.5–7.5 |
| Vinol 620(420) | 78.0–81.0 | 31.4–35.5 | 38 |
| Gohsenol KH-17 | 78.5–81.5 | 30.7–34.7 | 32–38 |
| Gelvatol 20-30 | 85.5–88.7 | 19.9–24.9 | 4–6 |
| Gohsenol GH-23 | 86.5–89.0 | 19.5–23.4 | 48–56 |
| Vinol 205 | 87.0–89.0 | 19.5–22.6 | 4–6 |
| Vinol 523 | 87.0–89.0 | 19.5–22.6 | 21–25 |
| Vinol 540 | 87.0–89.0 | 19.5–22.6 | 40–50 |

*These low hydrolysis level materials are not sufficiently soluble in plain water to permit equivalent viscosity values to be determined.

In recent years those skilled in the art have been paying more attention than ever to the importance of improving the porosity of vinyl chloride resins and, particularly, to the desirability of achieving improved porosity without significant reductions in bulk density or major shifts or upsets in particle size distribution of the resultant resin. However, in order to avoid the reverse relationship between the directions in which porosity and bulk density usually move when changes are effected, rather complicated dispersing agent systems have been resorted to heretofore.

For example, two exemplary prior art patents are U.S. Pat. No. 3,929,753 to Itoh et al. and U.S. Pat. No. 4,143,224 to Klippert et al. At least two different grades of polyvinyl alcohol suspending agent are used in each of these patents and, in addition, Klippert et al. employ still a third suspending agent of an entirely different type while Itoh et al. initiate polymerization in the presence of only the lower molecular weight PVC with the high molecular weight grade being added later during the course of the polymerization.

SUMMARY OF THE INVENTION

In accordance with the present invention, a surprisingly simple suspending agent system is used to accomplish the desired overall improvement in PVC resin products made by aqueous suspension technique. Thus, a single grade of polyvinyl alcohol (PVA) is combined in certain proportions with a hydroxypropyl cellulose ether (HPC) from the start of the aqueous suspension polymerization to yield PVC resins with surprisingly good levels of porosity and plasticizer absorption rate, as well as exceptionally sharp particle size distributions while simultaneously maintaining high bulk densities. Furthermore, this relatively simple suspending agent system is also quite versatile since weight proportions of the PVA to HPC ranging between about 1/5 and 2/1 can be employed while realizing an advantageous combination of porosity, bulk density and particle size distribution of the PVC resin products of the resultant aqueous suspension polymerizations.

Accordingly, the present invention encompasses the process of polymerizing vinyl chloride monomer with or without suitable comonomer in an aqueous suspension medium at temperatures between about 30° and about 80° C. in the presence of an oil soluble catalyst wherein said aqueous medium contains between about 0.02 to about 0.75 parts per 100 parts, by weight, of total monomer of a combination of suspending agents composed of (a) a polyvinyl alcohol resin (PVA) with a hydrolysis level of between about 68 percent and 78 percent and having a viscosity in a 4 percent, by weight, solution in water at about 25° C. of between about 1 and about 25 centipoises and (b) a hydroxypropyl cellulose ether (HPC) having a molar substitution (MS) of between about 2 and about 4 hydroxypropoxyl groups per anhydroglucose monomer unit in the cellulose chain, with the proportion of HPC/PVA, by weight, being between about 1/5 and about 2/1.

DETAILED DESCRIPTION OF THE PREFERRED EMBODIMENTS

In order to assure the attainment of the optimum combination of properties such as porosity and bulk density in the PVC resin product of the present process, the PVA suspending agent employed should have a hydrolysis level between about 70 percent and about 75 percent and an average molecular weight such that the viscosity of a 4 percent, by weight, solution of same in water at 25° C. will be between about 2 and about 15 centipoises while the HPC suspending agent should preferably have a molecular weight range such that at 25° C. a 2 percent, by weight, solution thereof in water will have a viscosity of between about 10 and about 300 centipoises. Furthermore, to assure a stable, narrow particle size range of the PVC product resin which is readily maintainable and reproducible from run to run, the proportion of HPC/PVA in the binary suspending agent system of this invention is ideally between about ⅔ and about 5/4, by weight. Also, in larger scale operations toward which commercial practice is currently moving, the optimum concentration of the combined suspending agents will usually tend to lie in the lower part of the general range previously stated, e.g., somewhere within the range of about 0.02 to about 0.25 percent based upon the total weight of monomer charged.

The best proportions of the respective PVA and HPC suspending agents and the optimum total concentrations thereof for use in a given situation will naturally depend heavily upon the exact grade of PVC product being produced, its molecular weight, etc. This, in turn, will involve many other factors such as the polymerization conditions used including temperature, pressure, monomer-to-water ratio, pH, etc., as well as the nature of the other auxiliary components and additives employed. However, the respective PVA and HPC suspending agents used in the present process are not only advantageously combinable with each other but also appear to be compatible with any of the other auxiliary components conventionally employed in vinyl chloride polymerization operations.

Thus, any of the usual comonomers can be employed herein such as ethylene, propylene or other olefins; vinyl acetate or other vinyl esters; vinyl ethers such as lauryl vinyl ether; and the various acrylates and methacrylates. Likewise, any of the various types of oil soluble catalysts can be used including the organic peroxides, azo compounds, organic peroxy carbonates, organosulfonyl peroxides and the like.

Also, the binary suspending agent system of this invention can tolerate any of the usual buffer systems normally employed and is effective under pH conditions from mildly acid to mildly alkaline. However, for grades of vinyl chloride resin where favorable porosity is the paramount property desired, operation of the polymerization process at slightly alkaline pH conditions (e.g., from about 7.5 to about 9.5) using an organic peroxide initiator system is the primary choice in the present invention.

Although vinyl chloride polymerizations can be conducted over a rather wide range of temperatures (e.g., from about 30° to about 80° C. as mentioned previously), the temperature range preferred for the most popular grades of vinyl chloride resin is from about 45° to about 75° C. Run times can also vary widely from as little as 1 or 2 hours to as much as 20 to 24 hours but in commercial scale operations are generally between about 4 and about 16 hours in length. The weight ratio of water to total monomer is generally in the range from about 4/5 to about 5/2, and preferably between about 1/1 and about 2/1.

Specific concrete embodiments of the present invention are described in the examples which follow along with certain directly comparative test results which illustrate some of the practical advantages obtainable. In these examples, all parts and percentages are given by weight unless otherwise specified.

EXAMPLE 1

A series of suspension type polymerizations of vinyl chloride were carried out in conventional, commercial style batch reactors equipped with agitators, jackets for circulating heating and/or cooling fluids as well as valved feed ports, vents and product discharge chutes. The total amount of water and vinyl chloride monomer charged per batch was kept substantially constant (weight ratio of $H_2O/VCM$=ca 1.33), and all other ingredients in the polymerization recipe were kept the same in both type and amount except for the suspending agents used. Some key properties of the resultant PVC resins obtained in repeated polymerizations (all at about 54° C.) with each of three different suspending agent systems are summarized in Table 2.

TABLE 2

| Susp. Agents Used | | Characterization of PVC Resins Produced | | | | | | | | | |
|---|---|---|---|---|---|---|---|---|---|---|---|
| Type | Conc. (based on monomer) | Bulk Density | BDUT (minutes) | Av. P.S. (microns) | % Retained on Sieve Screen of Mesh Size | | | | | | |
| | | | | | 40 | 60 | 80 | 100 | 140 | 200 | Pan |
| Methyl Cellulose Ether System | 0.07% | .483 | 4.5/8.0 | 144.6 | t | 1 | 15 | 26 | 43 | 12 | 4 |
| | 0.07% | .468 | 3.1/5.1 | 157.0 | t | 2 | 20 | 29 | 44 | 5 | t |
| PVA* | 0.1% | .464 | 3.0/5.0 | 140.7 | t | t | 10 | 25 | 53 | 13 | t |
| PVA* | 0.1% | .464 | 3.0/4.6 | 142.6 | t | t | 11 | 33 | 46 | 8 | 1 |
| PVA* + HPC** | 0.05% of each | .487 | 2.8/3.8 | 128.3 | t | t | 2 | 15 | 68 | 15 | 1 |
| PVA* + HPC** | 0.05% of each | .487 | 2.6/3.3 | 124.0 | t | t | 1 | 12 | 69 | 17 | t |

*A 72.5% hydrolyzed polyvinyl alcohol having a residual acetate content of 41.4 to 43.8%, by weight, and an average molecular weight of about 58,000 and a 4%, by weight, solution of which in water has a viscosity of about 5.5 to 7.5 centipoises at 25° C.

**Hydroxypropyl cellulose with a molar substitution of about three hydroxypropoxyl groups per anhydroglucose monomer unit, an average molecular weight of about 200,000 and a 5%, by weight, solution of which in water has a viscosity of between 150 to 400 centipoises at 25° C. as measured on a Brookfield LVF Viscosimeter @ 60 rpm of No. 2 spindle.

It will be seen that the combination of PVA and HPC suspending agents together produces a PVC resin of very narrow particle size distribution (substantially all between 80 and 200 mesh) and which has the desirable characteristics of both a high bulk density and a fast Brabender Dry-up Time.

EXAMPLE 2

Using the same size and type of equipment as in Example 1 and substantially the same basic recipe, another series of polymerizations was conducted at about 58° C. using varying proportions of the same PVA and HPC suspending agents in combination. The results of this series are summarized in Table 3.

TABLE 3

| Concentration of: | | Characterization of PVC Resins Produced | | | | | | | | | |
|---|---|---|---|---|---|---|---|---|---|---|---|
| PVA* (based on monomer) | HPC** | Bulk Density | BDUT (minutes) | Av. P.S. (microns) | % Retained on Sieve Screen of Mesh Size | | | | | | |
| | | | | | 40 | 60 | 80 | 100 | 140 | 200 | Pan |
| 0.08% | 0.015% | .473 | 3.1/5.0 | 143.6 | 1 | 0 | 2 | 37 | 50 | 7 | 1 |
| 0.07% | 0.03% | .483 | 3.3/5.0 | 132.3 | 0 | 0 | 2 | 22 | 66 | 10 | 0 |
| 0.06% | 0.04% | .481 | 2.8/4.8 | 134.1 | 0 | 0 | 3 | 28 | 58 | 11 | 1 |
| 0.06% | 0.05% | .475 | 2.9/4.7 | 146.0 | t | t | 8 | 40 | 48 | 5 | 0 |

*A 72.5% hydrolyzed polyvinyl alcohol having a residual acetate content of 41.4 to 43.8%, by weight, and an average molecular weight of about 58,000 and a 4%, by weight, solution of which in water has a viscosity of about 5.5 to 7.5 centipoises at 25° C.

**Hydroxypropyl cellulose with a molar substitution of about three hydroxypropoxyl groups per anhydroglucose monomer unit, an average molecular weight of about 200,000 and a 5%, by weight, solution of which in water has a viscosity of between 150 to 400 centipoises at 25° C. as measured on a Brookfield LVF Viscosimeter @ 60 rpm of No. 2 spindle.

An excellent combination of product properties is shown for all of the PVC resin products of Table 3, and the generally good reproducibility of same confirms that this is an unusually stable and dependable suspending agent system. In fact, none of the usual signs of PVC dispersion instability such as "chunking" (large aggregated clumps of particulate resin) or "b-b" formation (small individual pellets of hard, dense resin) were at all evident.

EXAMPLE 3

The substitution for the PVA used in Example 2 of a polyvinyl alcohol having a hydrolysis level of about 70 percent and a viscosity of about 2 centipoises at a 4 percent, by weight, concentration in water gave PVC products with a similar high level of overall properties. Likewise, the substitution for the HPC used in Example 2 of hydroxypropyl cellulose ethers of much lower and much higher molecular weights still gave outstanding PVC products with generally similar properties.

COMPARATIVE TEST A

When a cellulose ether of the hydroxypropyl cellulose type containing about 22 percent methoxyl groups and about 8 percent hydroxypropoxyl groups and a viscosity at a 2 percent, by weight, concentration in water of about 100 centipoises was substituted for the straight hydroxypropyl cellulose ether used in Example 2, the resultant PVC resins displayed a similar particle size and particle size distribution to those produced in Example 2. However, the Brabender Dry-up Times increased significantly (i.e., from about 3.0/5.0 to about 5.0/8.0 minutes) indicating a serious loss in porosity.

The foregoing examples illustrate certain characteristics and preferred embodiments of the present invention and are not to be construed as limitations thereof. Rather, the scope of the invention is measured by the claims thereto which follow.

What is claimed is:

1. A process for the suspension polymerization in an aqueous medium at temperatures between about 30° and about 80° C. of vinyl chloride monomer with or without suitable comonomer in the presence of an oil soluble initiator wherein said aqueous medium contains from about 0.02 to about 0.75 parts per 100 parts, by weight, of total monomer of a combination of suspending agents composed of (a) a polyvinyl alcohol resin (PVA) with a hydrolysis level of between about 68 percent and 78 percent and having a viscosity in a 4 percent, by weight, solution in water of between about 1 and about 25 centipoises, and (b) a hydroxypropyl cellulose ether (HPC) having a molar substitution of between about 2 and about 4 hydroxypropoxyl groups per anhydroglucose monomer unit in the cellulose chain, with the HPC/PVA ratio, by weight, being between about 1/5 and about 2/1.

2. The process according to claim 1 wherein said PVA has a hydrolysis level of between about 70 percent and about 75 percent and an average molecular weight such that the viscosity of a 4 percent, by weight, solution of same in water at 25° C. is between about 2 and about 15 centipoises.

3. The process of claim 1 or 2 wherein the HPC has a molecular weight such that at 25° C., a 2 percent, by weight, solution thereof in water has a viscosity between about 10 and about 300 centipoises.

4. The process of claim 3 wherein the temperature is between about 45° and about 75° C.

5. The process of claim 1 wherein the concentration of said combination of suspending agents is between 0.02 and about 0.25 percent based upon the total weight of monomer and the weight ratio of HPC/PVA is between about ⅜ and about 5/4.

6. The process according to claim 5 wherein said PVA has a hydrolysis level of between about 70 percent and about 75 percent and an average molecular weight such that the viscosity of a 4 percent, by weight, solution of same in water at 25° C. is between about 2 and about 15 centipoises.

7. The process of claim 5 or 6 wherein the HPC has a molecular weight such that at 25° C., a 2 percent, by weight, solution thereof in water has a viscosity between about 10 and about 300 centipoises.

8. The process of claim 7 wherein the temperature is between about 45° and about 75° F.

9. The process of claim 1, 2, 5 or 6 wherein the temperature is between about 45° and about 75° F.

* * * * *

UNITED STATES PATENT AND TRADEMARK OFFICE
CERTIFICATE OF CORRECTION

PATENT NO. : 4,283,516
DATED : August 11, 1981
INVENTOR(S) : William D. Peeples

It is certified that error appears in the above–identified patent and that said Letters Patent are hereby corrected as shown below:

Column 2, line 54, "fitting" should read --fitted--
Column 4, line 12, "PVC" should read --PVA--

Signed and Sealed this

Twenty-seventh Day of October 1981

[SEAL]

Attest:

GERALD J. MOSSINGHOFF

*Attesting Officer*    *Commissioner of Patents and Trademarks*